United States Patent
Tanabe (10) Patent No.: US 7,313,405 B2
(45) Date of Patent: Dec. 25, 2007

(54) RADIO COMMUNICATION SYSTEM, MOBILE TERMINAL AND RADIO COMMUNICATION METHOD

(75) Inventor: Shingo Tanabe, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 105 days.

(21) Appl. No.: 11/023,058

(22) Filed: Dec. 27, 2004

(65) Prior Publication Data

US 2005/0148320 A1 Jul. 7, 2005

(30) Foreign Application Priority Data

Dec. 26, 2003 (JP) ............................. 2003-435469

(51) Int. Cl.
  H04Q 7/20 (2006.01)
  H04M 1/00 (2006.01)
(52) U.S. Cl. .............................. 455/456.2; 455/456.1; 455/456.3; 455/456.5; 455/456.6; 455/550.1; 455/556.2; 455/433
(58) Field of Classification Search .. 455/456.1–456.6, 455/404.2, 433, 440, 443, 457, 461–463, 455/466, 566, 550.1, 560–561, 556.1, 556.2, 455/432.3, 403, 421, 418–419, 422.1, 517, 455/524, 432.1, 432.2, 435.1; 348/14.01, 348/14.02, 14.03; 340/539.1–539.2; 701/213–216, 701/207; 342/357.06, 357.07, 357.08, 357.09, 342/357.1, 357.12, 357.13; 370/310, 328, 370/312–313, 338
See application file for complete search history.

(56) References Cited

U.S. PATENT DOCUMENTS

| 6,091,956 | A  | * | 7/2000  | Hollenberg      | 455/456.5 |
| 6,236,365 | B1 | * | 5/2001  | LeBlanc et al.  | 342/457   |
| 6,388,618 | B1 | * | 5/2002  | Stilp et al.    | 342/457   |
| 6,662,016 | B1 | * | 12/2003 | Buckham et al.  | 455/457   |
| 6,885,874 | B2 | * | 4/2005  | Grube et al.    | 455/520   |
| 6,970,183 | B1 | * | 11/2005 | Monroe          | 348/143   |
| 7,057,557 | B2 | * | 6/2006  | Lee             | 342/465   |
| 7,181,225 | B1 | * | 2/2007  | Moton et al.    | 455/456.1 |
| 2002/0026289 | A1 | * | 2/2002  | Kuzunuki et al. | 702/150   |
| 2002/0032036 | A1 | * | 3/2002  | Nakajima        | 455/456   |
| 2002/0165910 | A1 | * | 11/2002 | Brown et al.    | 709/203   |

(Continued)

FOREIGN PATENT DOCUMENTS

CN 1447540 10/2003

(Continued)

Primary Examiner—Meless Zewdu
(74) Attorney, Agent, or Firm—Hogan & Hartson LLP (57) ABSTRACT

A radio communication system able to determine the position of each mobile terminal, able to deliver exact information, and able to precisely centrally manage the entire system, including mobile phones wirelessly transmitting image information obtained in image capturing portions and acquired locating information when receiving a request, and a management center including judging a position of each mobile phone based on the locating information transmitted from each mobile phone and storing the judged position information, and transmitting a request to the mobile phones and judging whether it received the locating information from all the mobile phones to which it transmitted the request, specifies any mobile phone from which it did not receive the locating information based on the position information of the database when it did not receive all the locating information, and transmits the latest position information of the identified mobile phone to the mobile phone located close to the identified mobile phone and makes a mobilization request.

12 Claims, 11 Drawing Sheets

U.S. PATENT DOCUMENTS

| | | | |
|---|---|---|---|
| 2003/0092429 A1* | 5/2003 | Chen et al. | 455/414 |
| 2003/0202104 A1* | 10/2003 | Werner | 348/207.99 |
| 2004/0044911 A1* | 3/2004 | Takada et al. | 713/201 |
| 2004/0053637 A1* | 3/2004 | Iida | 455/550.1 |
| 2004/0176103 A1* | 9/2004 | Trossen et al. | 455/414.1 |

FOREIGN PATENT DOCUMENTS

| | | |
|---|---|---|
| JP | 09-107410 | 4/1997 |
| JP | 2002-016726 | 1/2002 |
| JP | 2002-024975 | 1/2002 |
| JP | 2002-140778 | 5/2002 |
| JP | 2002-300570 | 10/2002 |
| JP | 2002-314715 | 10/2002 |
| JP | 2003-116169 | 4/2003 |
| JP | 2003-143261 | 5/2003 |
| JP | 2003134258 A * | 5/2003 |

* cited by examiner

(A) FRONT SURFACE   (B) BACK SURFACE

| POSITION INFORMATION (LATITUDE, LONGITUDE) | OWNER | TELEPHONE NUMBER | E-MAIL ADDRESS |
|---|---|---|---|
| NORTH LATITUDE: 35 DEGREES 30 MINUTES 11 SECONDS 7 EAST LONGITUDE: 139 DEGREES 29 MINUTES 48 SECONDS 5 | REGISTERED PERSON A | 090-1111-1111 | a@xxx.ne.jp |
| NORTH LATITUDE: 35 DEGREES 30 MINUTES 11 SECONDS 7 EAST LONGITUDE: 139 DEGREES 30 MINUTES 24 SECONDS 8 | REGISTERED PERSON B | 090-9999-9999 | b@xxx.ne.jp |
| NORTH LATITUDE: 35 DEGREES 30 MINUTES 11 SECONDS 7 EAST LONGITUDE: 139 DEGREES 34 MINUTES 8 SECONDS 6 | REGISTERED PERSON C | 090-1111-9999 | c@xxx.ne.jp |
| NORTH LATITUDE: 35 DEGREES 25 MINUTES 11 SECONDS 8 EAST LONGITUDE: 139 DEGREES 37 MINUTES 18 SECONDS 4 | REGISTERED PERSON D | 090-1111-2222 | d@xxx.ne.jp |
| NORTH LATITUDE: 35 DEGREES 27 MINUTES 15 SECONDS 7 EAST LONGITUDE: 139 DEGREES 44 MINUTES 48 SECONDS 4 | REGISTERED PERSON E | 090-1111-8888 | e@xxx.ne.jp |
| NORTH LATITUDE: 35 DEGREES 30 MINUTES 11 SECONDS 7 EAST LONGITUDE: 139 DEGREES 37 MINUTES 18 SECONDS 6 | REGISTERED PERSON F | 090 1234-5678 | f@xxx.ne.jp |
| ⋮ | ⋮ | ⋮ | ⋮ |

POSITION DATABASE

RADIO COMMUNICATION SYSTEM, MOBILE TERMINAL AND RADIO COMMUNICATION METHOD

BACKGROUND OF THE INVENTION

1. Field of the Invention

The present invention relates to a radio communication system utilizing a plurality of mobile terminals having radio communication functions via a mobile phone or other communication network and to a mobile terminal used in such a system, more particularly relates to a radio communication system that centrally manages current positions and situations of a plurality of mobile terminals able to acquire their own locating information at a management apparatus (management center) and a mobile terminal used in such a system, and to a radio communication method.

2. Description of the Related Art

In recent years, it has become common for mobile phones, one type of radio communication terminal, to be equipped with camera modules. Images captured by mobile phones provided with camera modules are transmitted (delivered) to other persons via a wireless communication network.

When using a mobile phone provided with this camera module, the user operates a shutter key to capture an image. On the other hand, there is a demand for enabling objects to be photographed at locations where there is no one present by enabling remote control of the image capturing operation of mobile phones provided with camera modules. To meet this demand, a mobile phone taking a picture in response to an image capturing request sent by radio communication has been proposed (Japanese Unexamined Patent Publication (Kokai) No. 2003-143261).

Since mobile phones and other mobile portable terminals now mount camera modules, it has been proposed to utilize these mobile portable terminals for security systems equipping policemen, guards, or engineers with mobile portable terminals, centrally managing security based on information from the mobile portable terminals via a wireless communication network such as image information and voice information from the carriers at a management apparatus (management center), and issuing instructions and mobilization commands to the carriers of the mobile portable terminals from the management center based on this information.

In the currently proposed systems etc., however, while it is possible to collect information from mobile portable terminals such as image information and voice information from the carriers via a wireless communication network, the management center side cannot obtain the positional information of the carriers of the mobile portable terminals. Accordingly, where for example a carrier of a mobile portable terminal moves etc., it is difficult for the management center side to maintain a determine of his correct position. Also, when a certain carrier requests assistance and the center wishes to request another carrier to go help, the center cannot determine there is any carrier located near the carrier requesting assistance and has trouble transmit accurate information to the carrier who can rush there fastest. Further, the carriers of the mobile portable terminals make rounds of the areas assigned to them in advance, but the management center side has trouble determining the current positions of the carriers of the mobile portable terminals and has trouble centrally managing the entire system.

SUMMARY OF THE INVENTION

An object of the present invention is to provide a radio communication system able to determine the position of each mobile terminal, able to deliver accurate information, and able to accurately centrally manage an entire system and a mobile terminal which can be used for that system, and a radio communication method.

To attain the above object, according to a first aspect of the present invention, there is provided a radio communication system comprising a plurality of mobile terminals and a management apparatus communicating with the plurality of mobile terminals via a communication network; the mobile terminal including a radio communication portion having a radio communication function, a location acquisition portion acquiring a locating information of the mobile terminal, and a first control portion making the radio communication portion transmit at least the locating information when receiving a request from the management apparatus; the management apparatus including a storing portion storing a position information of each mobile terminal based on the locating information transmitted from the plurality of mobile terminals, and a second control portion transmitting the request to the plurality of mobile terminals, judging whether the locating information has been received or not from all the mobile terminals that were transmitted with the request, and specifying a position of any mobile terminal from which the locating information has been received based on the position information stored in the storing portion when not receiving all locating information.

Preferably, the second control portion transmits the latest position information of any specified mobile terminal stored in the storing portion to at least one other mobile terminal.

Alternatively, the second control portion transmits the latest position information of any specified mobile terminal to at least one other mobile terminal located close to the specified mobile terminal based on the position information stored in the storing portion.

Alternatively, the second control portion loads positions of the mobile terminals in map data and transmits the latest position information of any specified mobile terminal to at least one other mobile terminal located close to the mobile terminal specified in the map data based on position information stored in the storing portion.

Alternatively, the second control portion detects a moving state of any specified mobile terminal based on the plurality of position information of specified mobile terminals stored in the storing portion and transmits the latest position information of any specified mobile terminal in response to the detected result.

Alternatively, the second control portion wirelessly calls up any specified mobile terminal and if there is no response to the call, transmits the latest position information of the specified mobile terminal.

Preferably, the mobile terminal includes a reporting portion reporting reception of the request from the management apparatus and a switch outputting an instruction for making the radio communication portion transmit information to the first control portion.

Alternatively, the mobile terminal has an image capturing device, and the second control portion makes the radio communication portion transmit image information captured by the image capturing device together with the locating information acquired by the location acquisition portion.

Preferably, the second control portion transmits the request at predetermined time intervals.

Preferably, the second control portion loads positions of the mobile terminals in map data based on the position information stored in the storing portion when the locating information has been received from all the mobile terminals that were transmitted with the request.

According to a second aspect of the present invention, there is provided a mobile terminal communicating via a communication network with a management apparatus which judges whether locating information has been received or not in response to a request, comprising a radio communication portion having a radio communication function; a location acquisition portion acquiring locating information; and a control portion making the radio communication portion transmit at least the locating information when receiving a request from the management apparatus.

According to a third aspect of the present invention, there is provided radio communication method, comprising steps of acquiring each locating information of a plurality of mobile terminals; transmitting a request from a management apparatus to the plurality of mobile terminals; transmitting at least the locating information from the mobile terminals when receiving the request from the management apparatus; storing a position information of each mobile terminal based on the locating information transmitted from the plurality of mobile terminals at the management apparatus; judging whether the locating information has been received or not from all the mobile terminals that were transmitted with the request; and specifying a position of any mobile terminal from which the locating information has been received based on the stored position information when not receiving all locating information.

BRIEF DESCRIPTION OF THE DRAWINGS

These and other objects and features of the present invention will become clearer from the following description of the preferred embodiments given with reference to the attached drawings, wherein.

Figure 11:
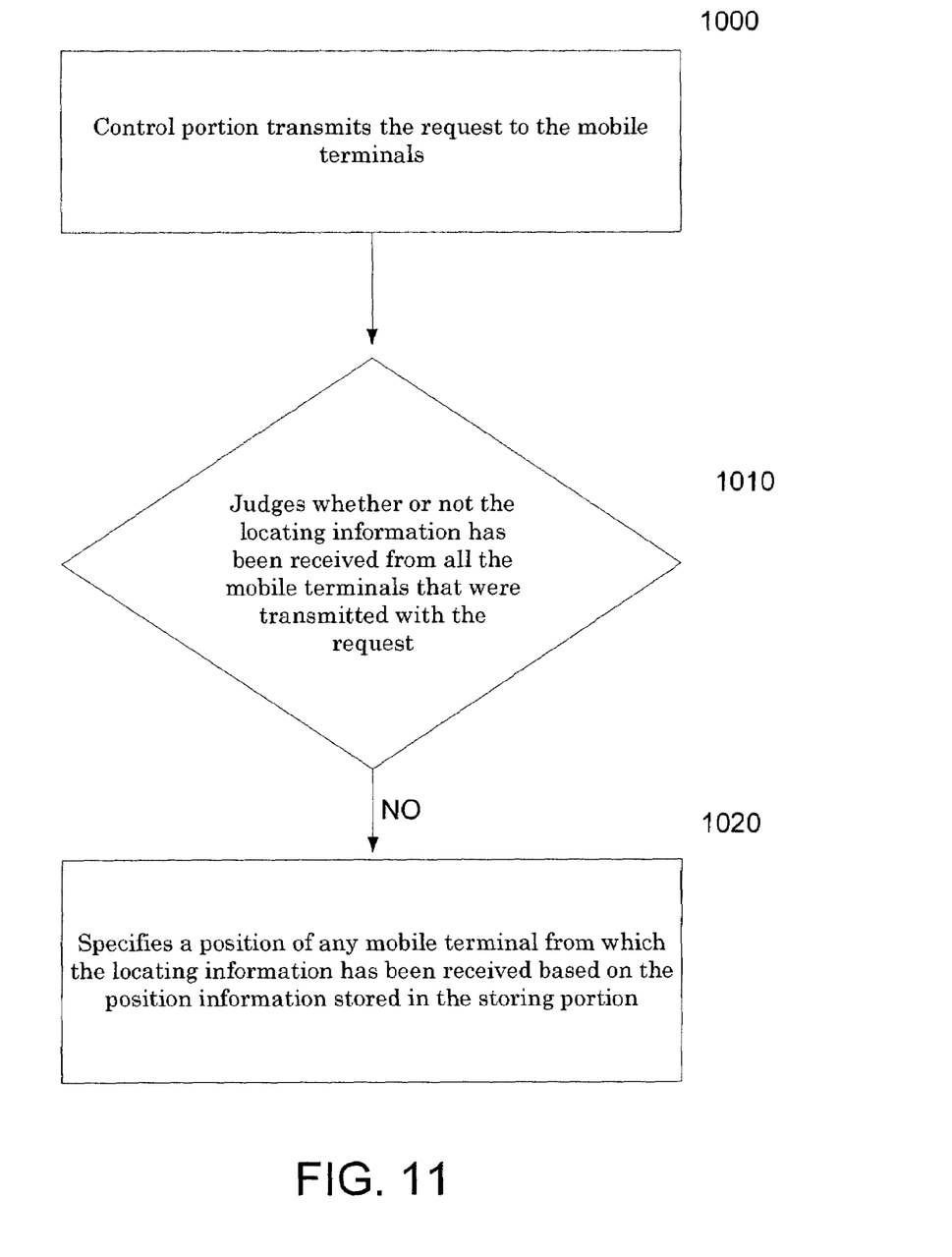
FIG. 11 is a functional flow chart for the management center according to an embodiment of the invention.

FIG. 11 is a functional flow chart for the management center. A second control portion of the management center transmits request to the multiple of mobile terminals (Step 1000). The management center then judges whether or not the locating information has been received from all the mobile terminals that were transmitted with the request (Step 1010). In the case not all the locating information has been received, the management center then specifies a position of any mobile terminal from which the locating information has been received based on the position information stored in the storing portion when not receiving all locating information (Step 1020).

DETAILED DESCRIPTION OF THE INVENTION

Below, an embodiment of the present invention will be explained with reference to the attached drawings.

Figure 1:
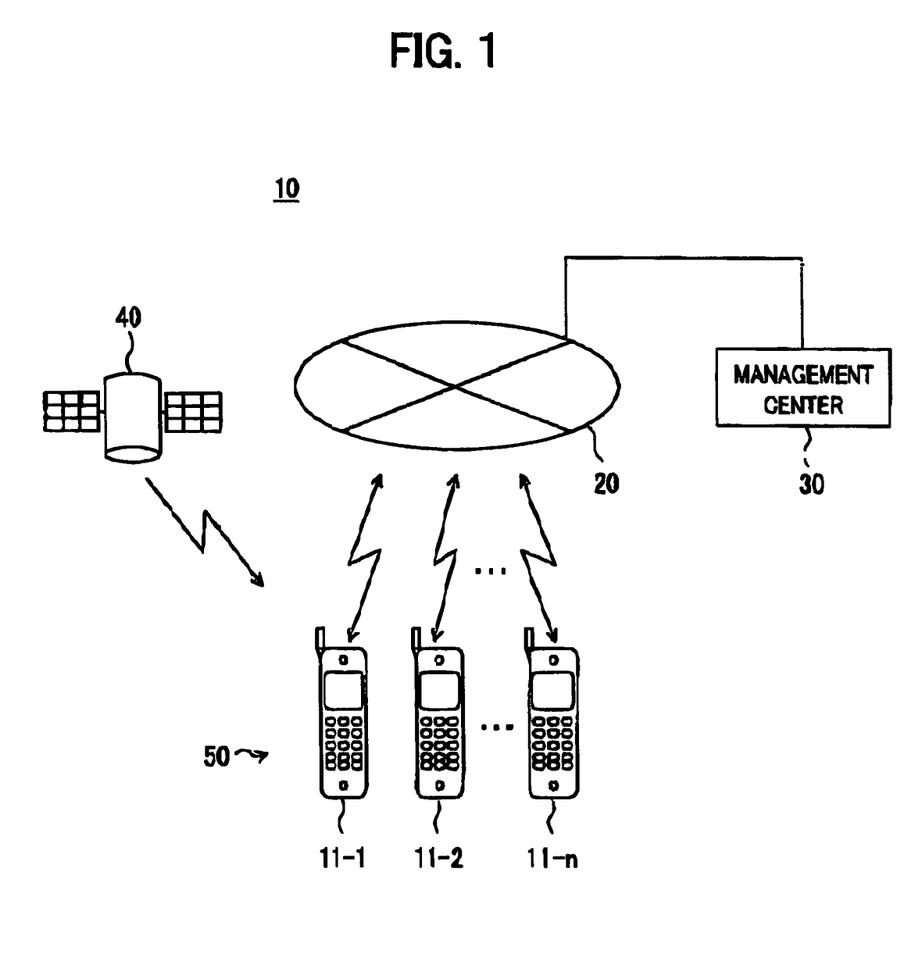
FIG. 1 is a view of the system configuration of a radio communication system according to an embodiment of the invention.
Figure 2:
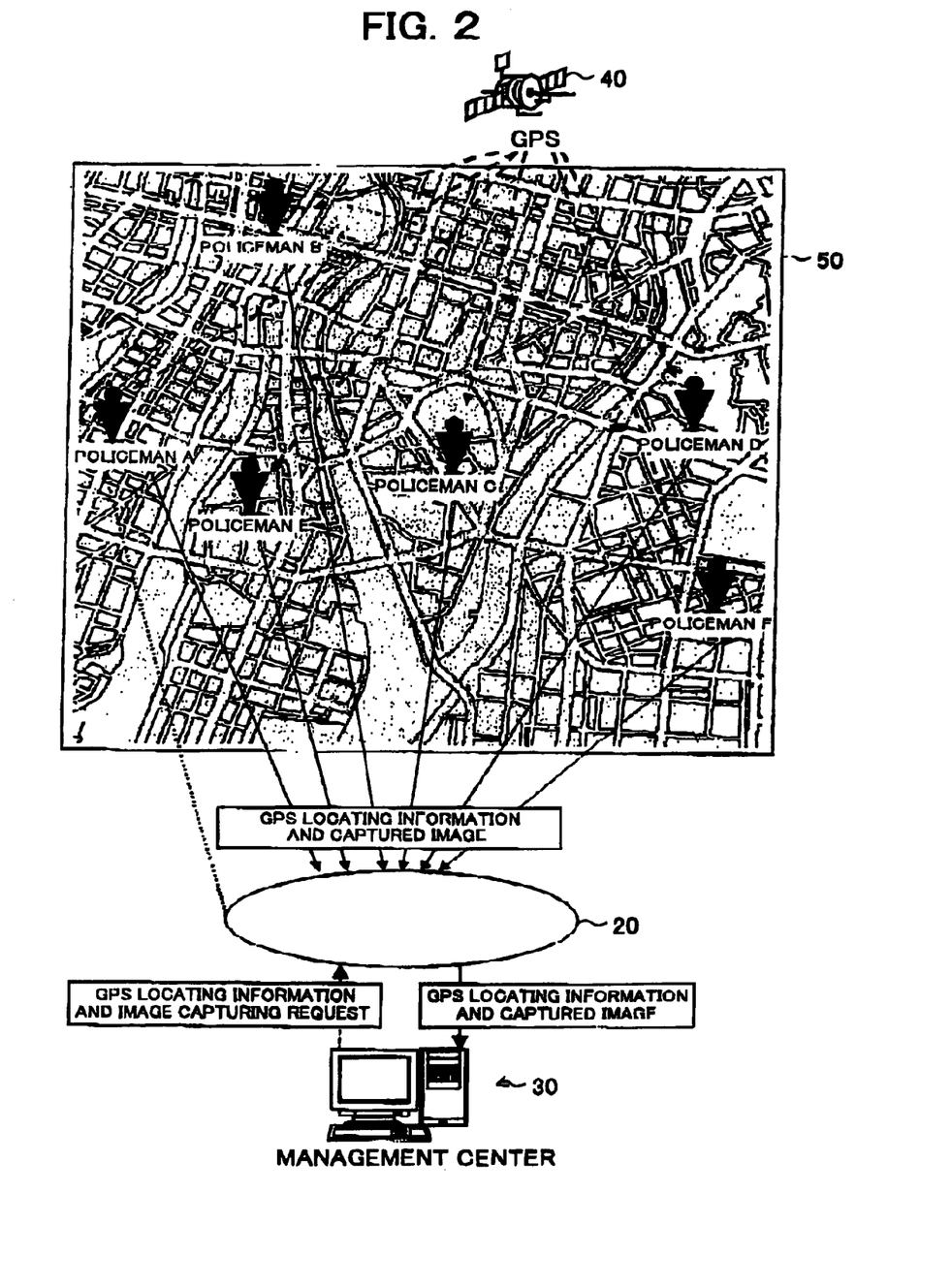
FIG. 2 is a view of the general system configuration of a radio communication system according to an embodiment of the invention.

FIG. 1 and FIG. 2 are views of the system configuration of a radio communication system according to an embodiment of the invention.

A radio communication system 10 according to the present embodiment has a plurality of mobile terminals constituted by mobile phones 11-1 to 11-$n$ (n=6 is used as an example in the present embodiment), a wireless communication network 20, a management apparatus constituted by a management center 30, global positioning system (GPS) satellites 40, and an area 50 for making rounds as main components.

In the present embodiment, a plurality of (six in the present embodiment) mobile phones 11-1 to 11-6 are lent to six policemen A to F in charge of sections of the area 50 determined in advance based on map information shown in FIG. 2. The policemen A to F carry these phones.

Figure 3:
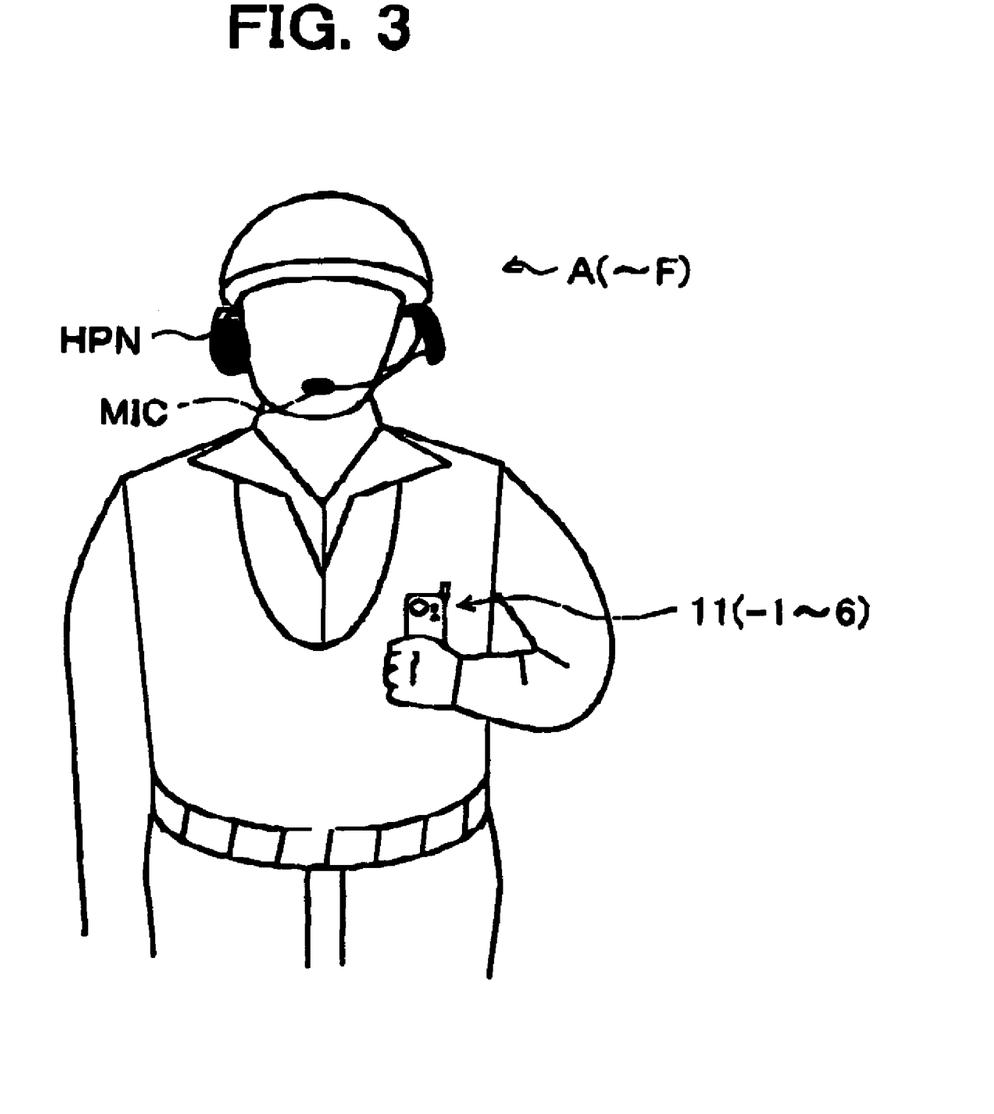
FIG. 3 is a view of an example of carrying a mobile phone according to an embodiment of the invention.

Each policeman A (to F) for example places the mobile phone 11-1 (to 11-6) in the left breast pocket of his uniform as shown in FIG. 3 so that the optical system of the camera module faces the front side and he can operate the image capturing key. Each policeman A (to F) has a headphone HPN and a microphone MIC connected to the mobile phone 11-1 (to 11-6) by not illustrated wires.

Each of the mobile phones 11-1 to 11-6 has the same functions. In addition to the usual functions of a mobile phone, it has an image capturing function by the mounted camera module and the function of receiving signals sent from three or more GPS satellites 40 circling known orbits to obtain its own locating information. Further, each of the mobile phones 11-1 to 11-6 has a reporting function (reporting portion) for reporting receipt of an information transmission request signal periodically transmitted from the management center 30 via the communication network 20 to the carrier constituted by the policeman A (to F) by for example predetermined sound information or vibration and a transmission instruction switch for transmitting image information and its own locating information. Further, each of the mobile phones 11-1 to 11-6 obtains the image information of a desired object when for example the image capturing key is operated by a policeman A (to F) recognizing the receipt of the information transmission request signal and wirelessly transmits the obtained image information and its own locating information via the communication network 20 to the management center 30 when the transmission instruction switch is operated.

Figure 4:
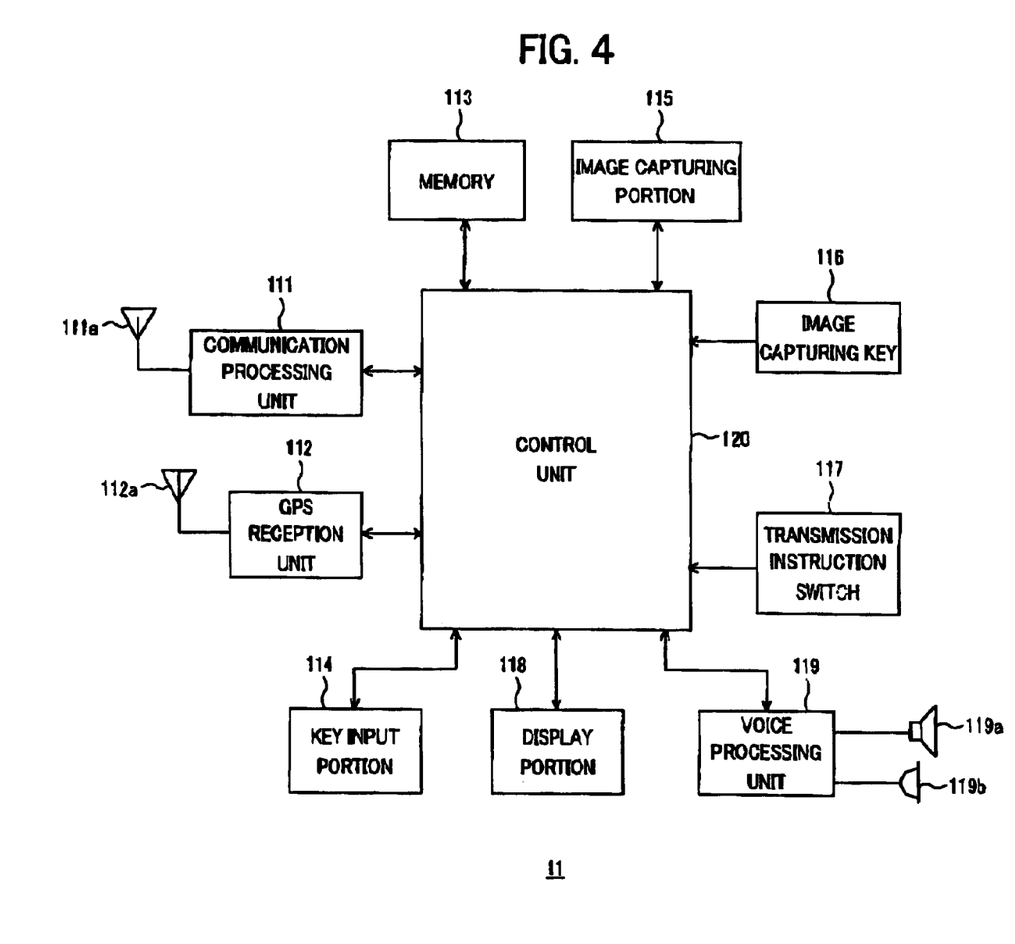
FIG. 4 is a view of an example of the appearance of a mobile phone according to an embodiment of the invention.
Figure 5:
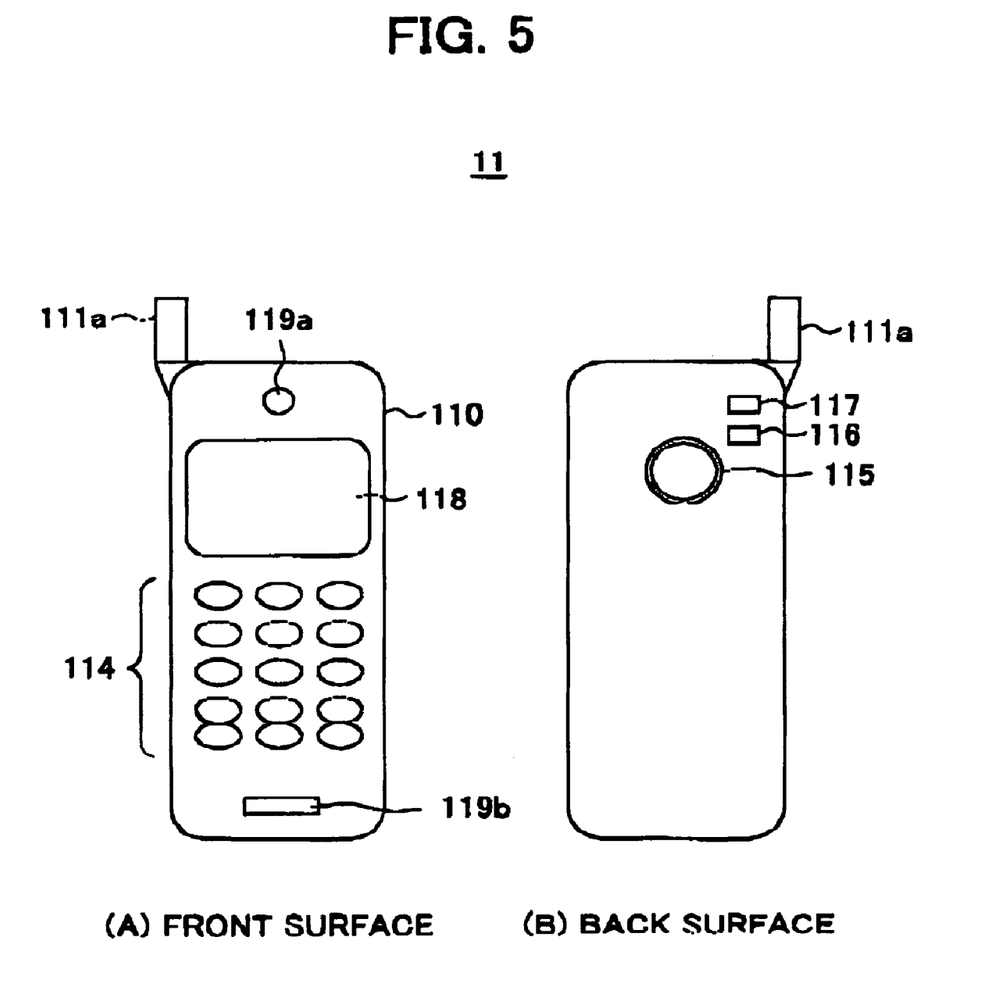
FIG. 5 is a block diagram of an example of the configuration of a mobile phone according to an embodiment of the invention.

FIG. 4 is a block diagram of an example of the configuration of a mobile phone according to the present embodiment. Further, FIGS. 5A and 5B are views of an example of the appearance of a mobile phone according to the present embodiment.

As shown in FIG. 4, each mobile phone 11 (−1 to −6) has a communication processing unit 111 including a transmission/reception antenna 111a, a GPS reception unit 112 including a GPS reception antenna 112a, a memory 113, a key input portion 114, an image capturing portion 115, an image capturing key 116, a transmission instruction switch 117, a display portion 118, a voice processing unit 119, and a first control portion constituted by a control unit 120. As shown in FIG. 5A, a front side of a body case 110 of the mobile phone 11 (−1 to −6) is provided with the transmission/reception antenna 111a, the key input portion 114, the display portion 118, a speaker 119a, and a microphone 119b. Further, as shown in FIG. 5B, the back surface side of the body case 110 of the mobile phone 11 (−1 to −6) is provided with an optical system including an object lens of the image capturing portion 115, a shutter portion 116, and the transmission instruction switch 117.

The communication processing unit 111 modulates image data, voice information, e-mail, and other information processed in the control unit 120 and transmits it through the transmission/reception antenna 111a to the communication network 20, including a not illustrated base station, for wireless communication utilizing radio. Further, the communication processing unit 111 receives a information transmission request signal periodically transmitted from the management center 30 via the communication network 20 at predetermined time intervals or image data, voice information, e-mail, etc. through the transmission/reception antenna 111a, demodulates the received information, and outputs the result to the control unit 120.

The GPS reception unit 112 receives the GPS radio signal for obtaining the locating information transmitted from the GPS satellites 40, applies signal processing such as amplification, noise elimination, and modulation to the same, and outputs the result to the control unit 120. The GPS radio signal received by the GPS reception unit 112 includes the correct position information of the GPS satellites 40 and the time information when the radio was sent.

The memory 113 includes a nonvolatile memory such as an EEPROM and stores the image data captured and compressed by the image capturing portion 115 and its own locating information obtained based on the GPS signal in the control unit 120.

The key input portion 114 has an end (speech end)/power supply key, start (callup) key, a plurality of ten keys corresponding to numbers, etc. and supplies the input information from the user to the control unit 120 by the operation of these keys. In the present embodiment, the image capturing key is separately provided at the back surface, but it is also possible to assign the function of the image capturing key to any key of the plurality of ten keys.

The image capturing portion 115 has an optical system including an object lens for fetching the object image and an image capturing processing circuit including an image capturing element for converting the image of the object focused on by the optical system to an electric signal.

The optical system is arranged at the back surface of the body case 110 of the mobile phone 11, so that the other side can capture an image from the user's point of view as shown in FIG. 5B and it focuses the optical image of the object on the light receiving surface of the image capturing element of the image capturing processing circuit.

The image capturing processing circuit converts the optical image of the object focused on by the optical system to an electric signal. Specifically, in the image capturing processing circuit, a plurality of light receiving elements arranged on a two-dimensional plane of the image capturing element receive the image of the object in units of pixels. At this time, it breaks down and fetches the color information to the three primary colors (R, G, B) through the color filters on the light receiving element. Then, the image capturing processing circuit converts the luminance value of each pixel to a voltage, sequentially converts the same to digital data by an analog/digital (A/D) converter, and supplies the result to the control unit 120. Note that, as the image capturing element, for example a CCD or COMS sensor is applied.

The image capturing key 116 is arranged in the vicinity of the position of arrangement of the image capturing portion 115 on the back surface of the body case 110 of the mobile phone 11 so that another party can be captured an image while the mobile phone is accommodated in the pocket of the uniform of the policeman A (to F) as it is as explained above. When the image capturing key 116 is operated, an optical image of the object is captured by the optical system.

The transmission instruction switch 117 is operated when wirelessly transmitting the image information obtained at the image capturing portion 115 and its own locating information via the communication network 20 to the management center 30. When the transmission instruction switch 117 is operated, a transmission instruction is input to the control unit 120. The control unit 120 outputs the image information and its locating information stored in the memory 113 to the communication processing unit 111 and makes it transmit them to the management center 30 by the transmission instruction.

The display portion 118 has a display device such as a liquid crystal display device (LCD) and displays the telephone number input for the speech function and various messages, text data, etc. Further, in the image capturing mode, the image of the object obtained by the image capturing portion 115 is displayed in the display portion 118.

The voice processing unit 119 has a voice processing circuit to which the speaker 119a for outputting voice for the speech function and the microphone 119b for inputting voice are connected. The voice processing unit 119 performs predetermined processing on the voice captured by the microphone 119b and outputs the same to the control unit 120. The voice processing unit 119 performs predetermined processing on the voice information supplied from the control unit 120 and outputs the sound from the speaker 119a. Further, the voice processing unit 119 makes the speaker 119a output an alarm sound indicating the reception of the information transmission request signal under the control of the control unit 120 when receiving an information transmission request signal from the management center 30.

The control unit 120 is configured using a microcomputer as the main element and controls the entire mobile phone 11. For example, the control unit 120 controls wireless transmission and reception of information in the communication processing unit 111, the reception of the GPS signal of the GPS reception unit 112, the processing of the voice information with respect to the voice processing unit 119, the display of the information to the display portion 118, the processing in response to the input information of the key input portion 114, access with respect to the memory 113, and so on.

The control unit 120 can operate by two control modes, for example, the radio communication mode and the image capturing mode. The radio communication mode is the mode enabling radio communication through the communication processing unit 111. In this mode, the control unit 120 makes the display portion 118 display the standard screen (a so-called standby screen) immediately after the power is turned on. In the radio communication mode, it is possible to perform a callup operation etc. by operation of the key input portion 114. Further, at the radio communication mode, it is possible to periodically receive the GPS signal from the GPS satellites 40 through the GPS reception unit 112.

The image capturing mode is the mode for photographing an object located at a position facing the user (policemen A to F). In the image capturing mode, the control unit 120 controls the display portion 118 to make it display the image data supplied from the image capturing portion 115 and stores the obtained image data in the memory 113.

The user (policemen A to F) can shift the control mode from the radio communication mode to the image capturing mode by the operation of the image capturing key 116. Further, it is also possible to configure the control unit 120 so as to automatically shift the control mode from the radio communication mode to the image capturing mode when receiving an information transmission request signal from the management center 30 by the communication processing unit 111.

The control unit 120 has a GPS position-finding function. Specifically, based on a GSP radio signal received through the GPS reception unit 112, it computes the position information (latitude and longitude) of the mobile phone 11 in which it is mounted every predetermined period and stores its computed own locating information in the memory 113. Then, the control unit 120 makes the communication processing unit 111 wirelessly transmit the locating (position) information obtained by the computation and/or the image information stored in the memory 113 to the management center 30.

The mobile phones 11-1 to 11-6 having the above explained configuration wirelessly transmit the locating information and/or the image information to the management center 30 in response to an information transmission request signal transmitted from the management center 30 at predetermined time intervals. The management center 30 is configured so as to periodically transmit the information transmission request signal in this way and centrally manage the positions where the policemen A to F carrying the plurality of mobile phones 11-1 to 11-6 are located and their surrounding situations. Below, an explanation will be given of the specific configuration and function of the management center according to the present embodiment with reference to the drawings.

Figure 6:
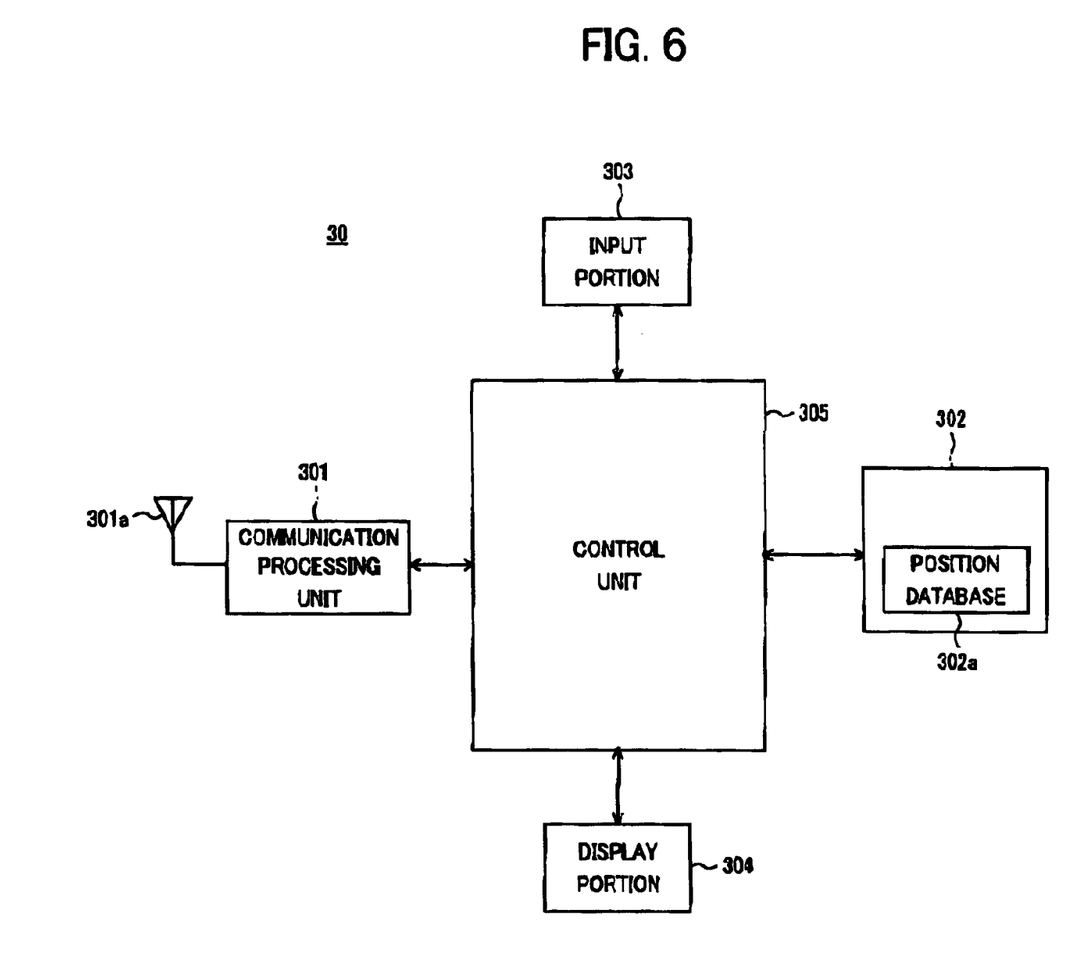
FIG. 6 is a block diagram of an example of the configuration of a management center according to an embodiment of the invention.

FIG. 6 is a block diagram of an example of the configuration of the management center according to the present embodiment.

The management center 30, as shown in FIG. 6, has a communication processing unit 301 including a transmission/reception antenna 301*a*, a database portion 302 including an information storing portion constituted by a position information management database 302*a*, an input portion 303, a display portion 304, and a second control portion constituted by a control unit 305.

The communication processing unit 301 modulates the image data, text data, and other information processed in the control unit 305 and the position information etc. of registered persons registered in the position information management database 302*a* and transmits the results to a not illustrated base station by the transmission/reception antenna 301*a* for wireless communication utilizing a radio.

Further, the communication processing unit 301 engages in radio communication with the mobile phones 11-1 to 11-6. Namely, it demodulates the image data, locating information, text data, and other information wirelessly transmitted from the base station via the communication network 20 and received at the transmission/reception antenna 301*a* and outputs the results to the control unit 305.

The database portion 302 is configured by a hard disk device or a nonvolatile memory such as an EEPROM. The database portion 302 includes position information management database 302*a* for managing the position information for each mobile phone (for every policeman).

Figure 7:
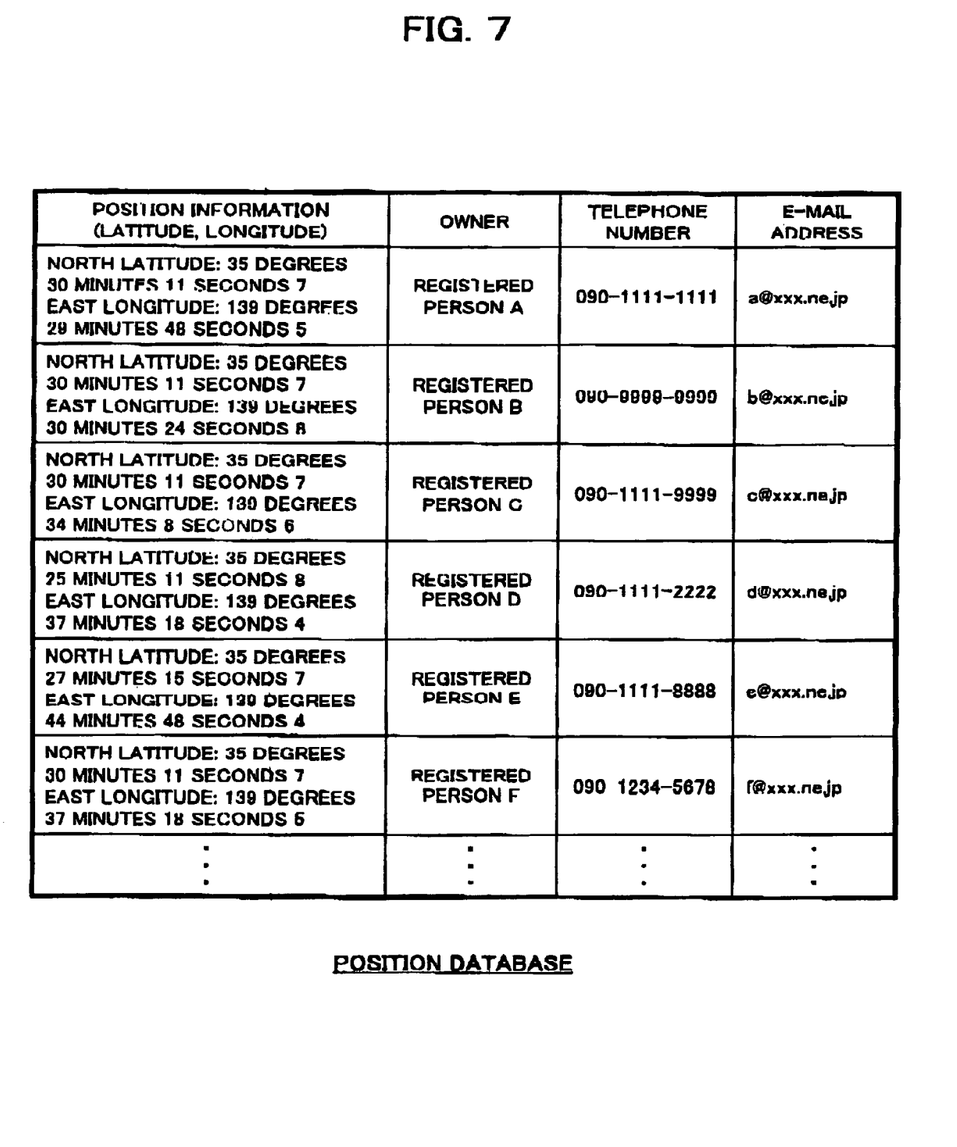
FIG. 7 is a view of an example of data stored in a position information management database according to an embodiment of the invention.

FIG. 7 is a view of an example of the data stored in the position information management database 302*a* according to the present embodiment. In the position information management database 302*a*, as shown in FIG. 7, the carriers of the mobile phones 11-1 to 11-6 (owners constituted by policemen A to F) and their position information are stored linked with each other. The data accompanying each mobile phone (owner) such as the telephone number and e-mail address is stored for each mobile phone (for every owner). The position information (latitude and longitude) of the position information management database is updated by the control unit 305 one after another. Further, the database portion 302 stores the image data transmitted by the management center 30 from the mobile phones 11-1 to 11-6 and received at the communication processing unit 301.

The input portion 303 is configured by a keyboard, mouse, etc. The manager of the management center 30 operates the input portion 302 for updating information registered in the position information management database 302*a*, for example, information such as owners and their telephone numbers as shown in FIG. 7.

The display portion 304 is configured by a display device such as a CRT or LCD and displays an image including the positions of the carriers (owners) of the mobile phones 11-1 to 11-6 constituted by the policemen A to F in the map data as for example the area 50 shown in FIG. 2 based on the position information stored in the position information management database when judging the reception of the locating information of all mobile phones 11-1 to 11-6 as the response to the information transmission request signal by for example the control unit 305. Note that the display portion 304 is configured so that various information such as the image information transmitted from the mobile phones 11-1 to 11-6 and the information input by the input portion 303 can be displayed under the control of the control unit 305.

The control unit 305 is configured using a micro computer as the main element and controls the entire management center 30. For example, the control unit 305 controls the wireless transmission and reception of various information in the communication processing unit 301, the processing in response to the input information of the input portion 303, the access to the database portion 302, etc.

The control unit 305 wirelessly transmits an information transmission request signal to all mobile phones 11-1 to 11-6 through the communication processing unit 301 every predetermined time, judges whether locating information was received from all mobile phones to which it transmitted the information transmission request signal, receives the image information and the locating information transmitted from the mobile phones' 11-1 to 11-6 in response to this information transmission request signal, judges current positions of the mobile phones 11-1 to 11-6 based on the locating information, and, when receiving the information from all mobile phones 11-1 to 11-6, makes the display portion 304 display the image of the positions of the carriers (owners) of the mobile phones 11-1 to 11-6 constituted by the policemen A to F in the map data like in the area 50 shown in FIG. 2 based on the position information stored in the position information management database 302a. When the received locating information is different from the information stored in the position information management database 302a, the control unit 305 updates the position information of the corresponding mobile phones in the position information management database 302a by the received locating information, stores the received image information in the database portion 302, and makes for example another display portion display the image.

When the control unit 305 transmits an information transmission request signal to all mobile phones 11-1 to 11-6 and judges that the locating information from all mobile phones to which the information transmission request signal was transmitted were not received, it identifies any mobile phone from which it did not receive the locating information based on the position information stored in the position information management database 302a. Then, the control unit 305 transmits the position information of any identified mobile phone stored in the position information management database 302a to at least one other mobile terminal. In this case, the control unit 305 transmits the position information of the specified mobile phone to at least one other mobile phone located close to the identified mobile phone based on the position information stored in the position information management database 302a. Note that, in this case as well, the display portion 304 is made to display an image of the positions of the carriers (owners) of the mobile phones 11-1 to 11-6 constituted by the policemen A to F in the area 50 shown in FIG. 2 based on the position information stored in the position information management database 302a and transmitted this to at least one mobile phone located close to (having a short distance from) the mobile phone identified on the map. The control unit 305 estimates and judges (detects) the moving state of the specified mobile phone, specifically the movement distance, from the time etc. based on the plurality of position information of the identified mobile phone stored in the position information management database 302a and transmits the latest position information of the identified mobile phone in response to the judged (detected) result. Further, the control unit 305 wirelessly calls up the identified mobile phone. When there is no response to the call, it transmits the latest position information of the identified mobile phone to another mobile phone located close to the identified mobile phone.

Figure 8:
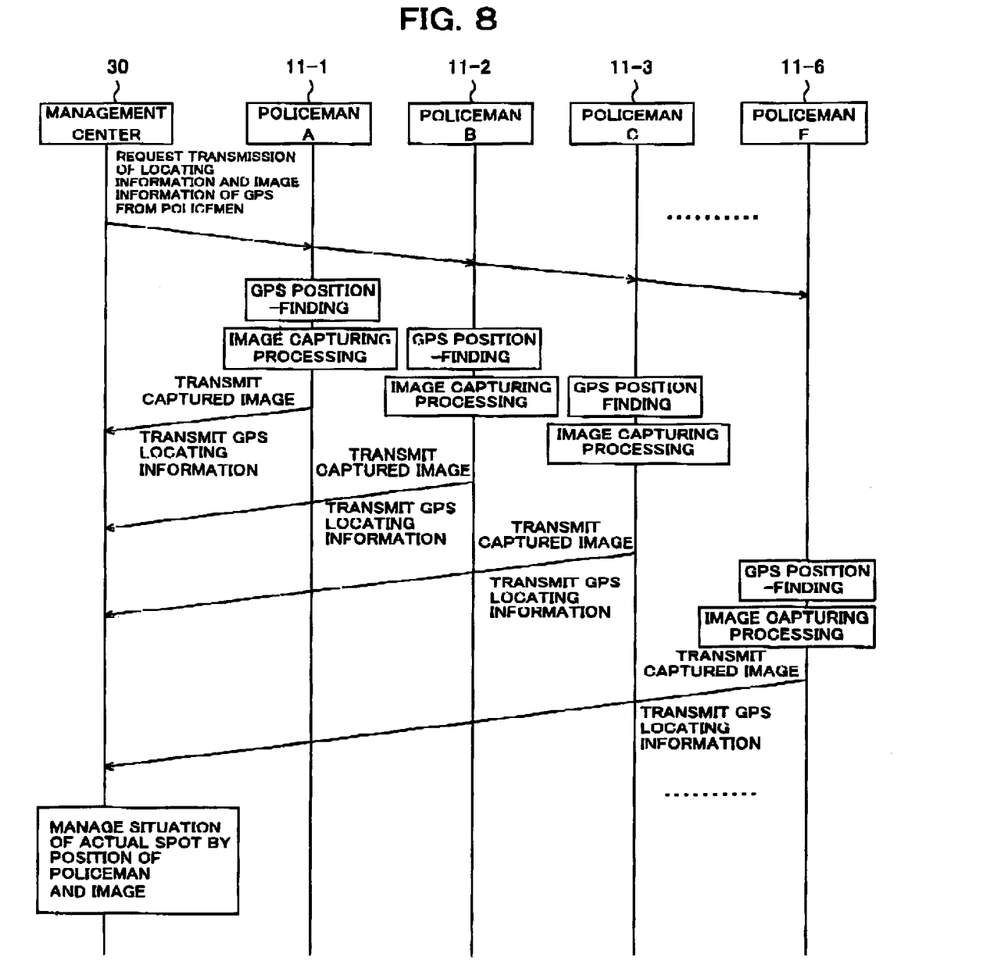
FIG. 8 is a sequence diagram for explaining the operation of a radio communication system according to an embodiment of the invention.
Figure 9:
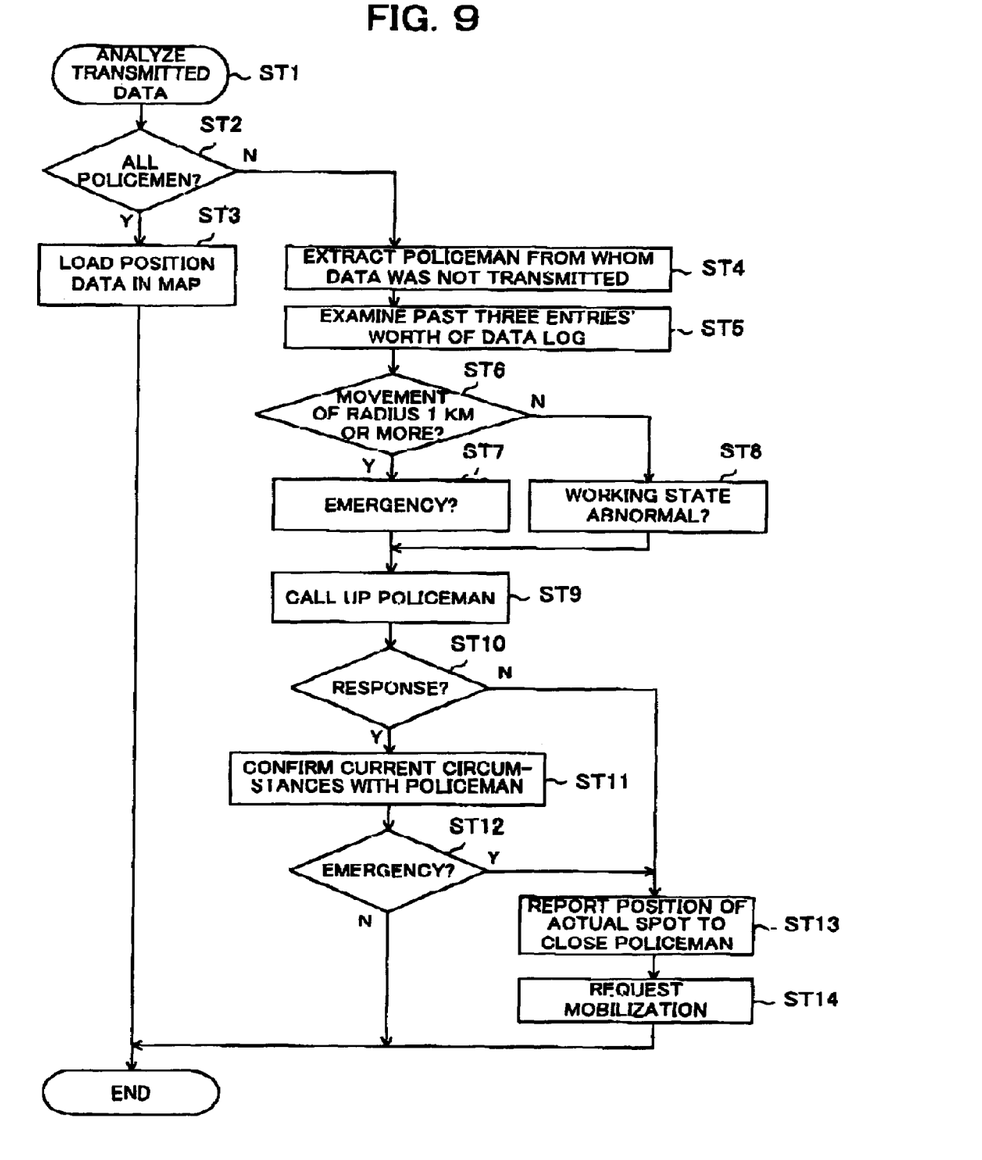
FIG. 9 is a flow chart for explaining the operation of the management center in a radio communication system according to an embodiment of the invention.

Next, an explanation will be given of the operation of the radio communication system according to the present embodiment with reference to FIG. 8 and FIG. 9. FIG. 8 is a sequence diagram for explaining the operation of the radio communication system according to the present embodiment. Further, FIG. 9 is a flow chart for explaining the operation of the management center in the radio communication system according to the present embodiment.

In the present embodiment, a plurality of (six in the present embodiment) mobile phones 11-1 to 11-6 are lent to six policemen A to F in charge of the area 50 determined in advance based on map information such as shown in FIG. 2. The policemen A to F carry the mobile phones and patrol the assigned regions.

In this state, for centrally managing the positions where the policemen A to F carrying a plurality of mobile phones 11-1 to 11-6 are located and their surrounding situations, the management center 30 periodically and wirelessly transmits an information transmission request signal for requesting transmission of image information and locating information to the mobile phones 11-1 to 11-6 through the communication processing unit 301.

The information transmission request signal transmitted from the management center 30 is wirelessly transmitted to the mobile phones 11-1 to 11-6 via the communication network 20.

Each mobile phone 11-1, based on the GSP wave signal received through the GPS reception unit 112, computes the position information (latitude and longitude) of the mobile phone 11 in which it is mounted for every predetermined period and stores its computed own locating information in the memory 113. Further, each mobile phone 11-1 receives the information transmission request signal from the management center 30 through the communication processing unit 111 and supplies this to the control unit 120. When receiving an information transmission request signal, the control unit 120 controls the voice processing unit 119 and makes the speaker 119a output an alarm sound indicating the receipt of the information transmission request signal. Each of the carriers of the mobile phones 11-1 to 11-6 constituted by the policemen A to F to which the receipt of the information transmission request signal is reported by this alarm sound operate their image capturing switches 116 to obtain images of their surroundings. The control units 120 control the display portions 118 to make them display the image data supplied from the image capturing portions 115 and store the obtained image data in the memories 113. Then, when the transmission instruction switches 117 are operated by the carriers of the mobile phones 11-1 to 11-6 constituted by the policemen A to F, the control units 120 make the communication processing units 111 wirelessly transmit the position-finding (position) information obtained by the computation and the image information stored in the memories 113 to the management center 30.

The management center 30 receives the image information and locating information transmitted from the mobile phones 11-1 to 11-6 through the communication processing unit 301 and supplies the same to the control unit 305. The control unit 305 analyzes the image information and the locating information (ST1). Then, the control unit 350 judges whether the information was sent from all mobile phones 11-1 to 11-6, in other words, all policemen A to F, in response to the information transmission request signal (ST2).

At step ST2, when judging that the information was sent from all of the policemen A to F in response to the information transmission request signal, the control unit 305 makes the display portion 304 display an image of the positions of the carriers (owners) of the mobile phones 11-1 to 11-6 constituted by the policemen A to F in the area 50 shown in FIG. 2 in the map data based on the position information stored in the position information management database 302a (ST3). Further, when any received locating information is different from the information stored in the position information management database 302a, the control unit 305 updates the position information in the position information management database 302a of the corresponding mobile phone by the received locating information and stores the received image information in the database portion 302.

When judging at step ST2 that the information was not sent from all of the policemen A to F in response to the information transmission request signal, the control unit 305 identifies any mobile phone from which it did not receive the locating information, for example, the mobile phone 11-1 carried by the policeman A, based on the position information stored in the position information management database 302a (ST4). Then, the control unit 305 examines for example the past three entries' worth of the data log and computes the movement distance of the policeman A carrying the mobile phone 11-1 (ST5). Next, it judges whether the shortest movement distance of the policeman A carrying the mobile phone 11-1 is for example 1 km or more (ST6).

At step ST6, when judging that the shortest movement distance of the policeman A carrying the mobile phone 11-1 is 1 km or more, it decides that an emergency situation occurred during the predetermined patrol duty (ST7). When judging that the movement distance is less than 1 km, it decides that he did not execute the predetermined patrol duty and that an abnormal working state occurred (ST8) and automatically calls up the telephone number of the mobile phone 11-1 stored in the position information management database 302a (ST9). Then, it judges whether there is a response from the policeman A to this call (ST10).

When there is response at step ST10, the manager of the management center 30 confirms the current situation with the policeman A (ST11). When an emergency is occurring (ST12), the control unit 305 transmits the latest position information of the identified mobile phone 11-1 to at least one mobile phone located close to the identified mobile phone based on the position information stored in the position information management database 302a (ST13) and makes a mobilization request (ST14). Further, in a case where there is no response in a predetermined time at step ST10 as well, the control unit 305 judges that an emergency is occurring and transmits the latest position information of the identified mobile phone 11-1 to at least one mobile phone located close to the identified mobile phone based on the position information stored in the position information management database 302a (ST13) and makes a mobilization request (ST14).

Figure 10:
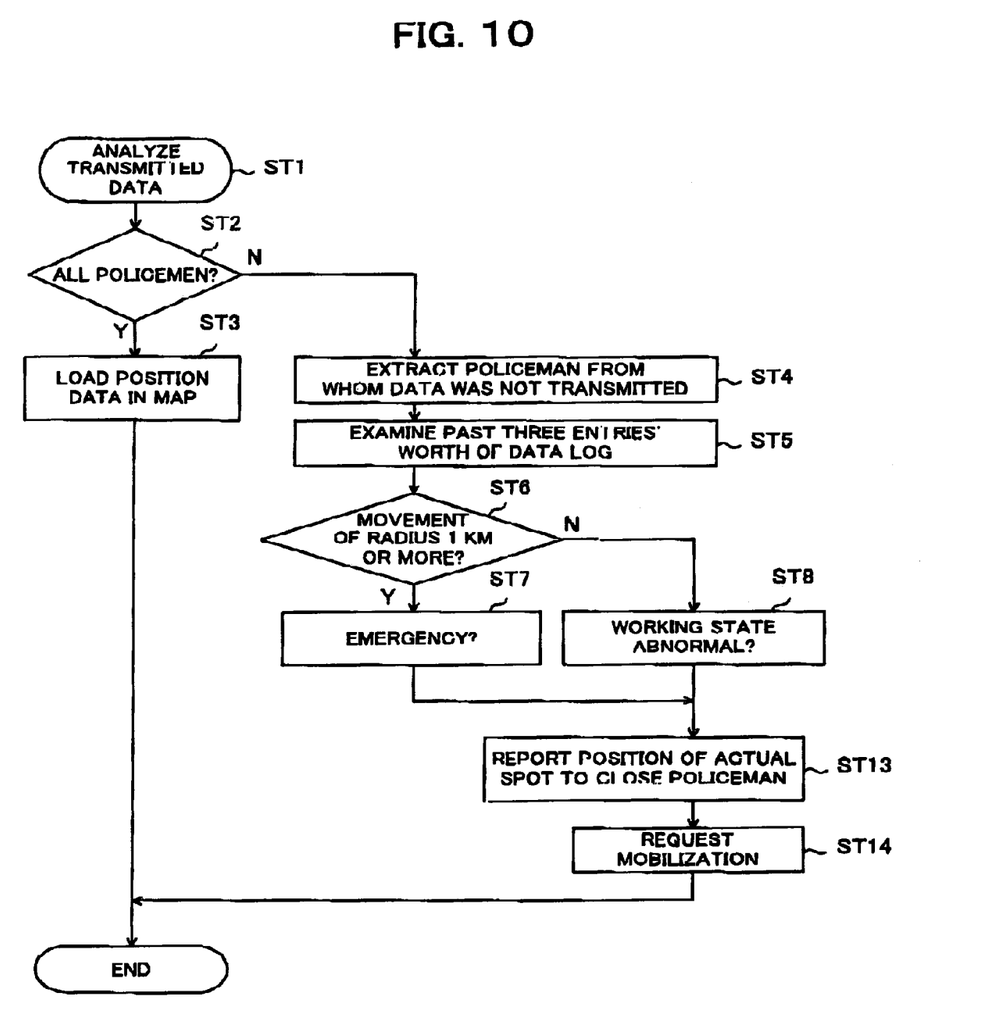
FIG. 10 is a flow chart for explaining another operation in a radio communication system according to an embodiment of the invention.

Note that, in the above explanation, when it was decided at step ST7 that an emergency occurred and it was decided at step ST8 that an abnormal working state occurred, it was decided whether an emergency occurred after automatically calling up and confirming the situation, but it is also possible to configure the system so that, for example, as shown in FIG. 10, when it is decided at step ST7 that an emergency occurred and it is decided at step ST8 that an abnormal working state occurred, the latest position information of the identified mobile phone 11-1 is transmitted to at least one mobile phone located close to the specified mobile phone based on the position information stored in the position information management database 302a (ST13), and a mobilization request is made (ST14) without a call.

As explained above, according to the present embodiment, since the system is provided with the mobile phones 11-1 to 11-6 including the communication processing unit 111 having a radio communication function, able to acquire their own locating information and able to make their communication processing units transmit image information obtained-in the image capturing portions 115 and the acquired locating information when receiving an information transmission request from the management center 30, and the management center 30 which judges the current position of each mobile phone based on the locating information transmitted from a plurality of mobile phones, stores the judged position information into the position information management database and transmits the information transmission request to a plurality of mobile phones, judges whether it received the locating information from all the mobile phones to which it transmitted the information transmission request, and, when not receiving all the locating information, identifies any mobile phone from which it did not receive the locating information based on the position information stored in the position information management database and transmits the latest position information of the identified mobile phone to at least one mobile phone located close to the identified mobile phone based on the stored position information to request mobilization, there are the advantages that the position of each mobile phone can be determined, the exact information can be delivered, and the entire system can be accurately centrally managed. Further, the position of any mobile phone can be determined at any time based on the information stored in the position information management database, a request for mobilization can be precisely delivered to the carrier of a mobile phone located close by, and in addition quick handling becomes possible.

Note that the number etc. of the mobile phones are not limited to those of the present embodiment. Various aspects are possible.

While the invention has been described with reference to specific embodiments chosen for purpose of illustration, it should be apparent that numerous modifications could be made thereto by those skilled in the art without departing from the basic concept and scope of the invention.

What is claimed is:

1. A radio communication system comprising:
a plurality of mobile terminals and a management apparatus communicating with the plurality of mobile terminals via a communication network;
each mobile terminal including:
a radio communication portion having a radio communication function;
a location acquisition portion acquiring a locating information of the mobile terminal; and
a first control portion making the radio communication portion transmit at least the locating information when receiving a request from the management apparatus;
the management apparatus including:
a storing portion storing a position information of each mobile terminal based on the locating information transmitted from the plurality of mobile terminals; and
a second control portion periodically transmitting the request to the plurality of mobile terminals;
judging current positions of mobile phones based on the locating information from each mobile terminal that was transmitted with the request;
storing the judged position information of each mobile terminal into the storing portion;
judging whether the locating information has been received or not from all the mobile terminals that were transmitted with the request;
specifying a mobile terminal from which the locating information has not been received in response to the request and specifying a position information of the mobile terminal from which the locating information has not been received based on the position information stored in the storing portion; and
transmitting the position information of any specified mobile terminal stored in the storing portion to at least one other mobile terminal.

2. A radio communication system as set forth in claim 1, wherein the second control portion transmits the latest position information of any specified mobile terminal to at least one other mobile terminal located close to the specified mobile terminal based on the position information stored in the storing portion.

3. A radio communication system as set forth in claim 1, wherein the second control portion loads positions of the mobile terminals in map data and transmits the latest position information of any specified mobile terminal to at least one other mobile terminal located close to the mobile terminal specified in the map data based on position information stored in the storing portion.

4. A radio communication system as set forth in claim 1, wherein the second control portion detects a moving state of any specified mobile terminal based on the plurality of position information of specified mobile terminals stored in the storing portion and transmits the latest position information of any specified mobile terminal in response to the detected result.

5. A radio communication system as set forth in claim 1, wherein the second control portion updates the position information in the storing portion when the judged position information is different from the position information already stored in the storing portion; and
the second control portion wirelessly calls up any specified mobile terminal from which the locating information has not been received in response to the request and if there is no response to the call, transmits the latest position information of the specified mobile terminal to at least one other mobile terminal.

6. A radio communication system as set forth in claim 1, wherein the mobile terminal includes
a reporting portion reporting reception of the request from the management apparatus; and
a switch outputting an instruction to the first control portion for making the radio communication portion transmit information.

7. A radio communication system as set forth in claim 1, wherein:
the mobile terminal has an image capturing device; and
the first control portion makes the radio communication portion transmit image information captured by the image capturing device together with the locating information acquired by the location acquisition portion.

8. A radio communication system as set forth in claim 1, wherein the second control portion transmits the request at predetermined time intervals.

9. A radio communication system as set forth in claim 1, wherein the second control portion loads positions of the mobile terminals in map data based on the position information stored in the storing portion when the locating information has been received from all the mobile terminals that were transmitted with the request.

10. A mobile terminal communicating via a communication network with a management apparatus which has a position information of each mobile terminal based on a locating information transmitted from the plurality of mobile terminals, judges current positions of mobile phones based on the location information from each mobile terminal that was transmitted with a request, judges whether locating information has been received or not in response to the request, specifies a mobile terminal from which the locating information has not been received, and transmits a position information of any specified mobile terminal, comprising:

a radio communication portion having a radio communication function;
a location acquisition portion acquiring locating information;
a first control portion making the radio communication portion transmit at least the locating information when receiving a request from the management apparatus;
a reporting portion reporting reception of the request from the management apparatus; and
a switch outputting an instruction to the first control portion for making the radio communication portion transmit information, wherein
when the mobile terminal has not transmitted the locating information in response to the request, it is judged from which the locating information has not been received and specified by the management apparatus; and
when the mobile terminal has transmitted the locating information in response to the request, it is transmitted a position information of any other specified mobile terminal from the management apparatus.

11. A mobile terminal as set forth in claim 10, wherein
the mobile terminal has an image capturing device; and
the control portion makes the radio communication portion transmit image information captured by the image capturing device together with the locating information acquired by the location acquisition portion.

12. A radio communication method, comprising steps of:
acquiring each locating information of a plurality of mobile terminals;
transmitting a request from a management apparatus to the plurality of mobile terminals;
transmitting at least the locating information from the mobile terminals when receiving the request from the management apparatus;
storing a position information of each mobile terminal based on the locating information transmitted from the plurality of mobile terminals at the management apparatus;
judging current positions of mobile phones based on the locating information from each mobile terminal that was transmitted with the request;
storing the judged position information of each mobile terminal;
judging whether the locating information has been received or not from all the mobile terminals that were transmitted with the request;
specifying a mobile terminal from which the locating information has not been received in response to the request and specifying a position information of the mobile terminal from which the locating information has not been received based on the stored position information; and
transmitting the stored position information of any specified mobile terminal to at least one other mobile terminal.

* * * * *